(12) United States Patent  (10) Patent No.: US 8,700,861 B1
Throop et al.  (45) Date of Patent: Apr. 15, 2014

(54) MANAGING A DYNAMIC LIST OF ENTRIES FOR CACHE PAGE CLEANING

(75) Inventors: Dean D. Throop, Efland, NC (US); Jason Taylor, Apex, NC (US)

(73) Assignee: EMC Corporation, Hopkinton, MA (US)

( * ) Notice: Subject to any disclaimer, the term of this patent is extended or adjusted under 35 U.S.C. 154(b) by 204 days.

(21) Appl. No.: 13/432,550

(22) Filed: Mar. 28, 2012

(51) Int. Cl.
*G06F 12/12* (2006.01)
*G06F 12/08* (2006.01)

(52) U.S. Cl.
CPC ............ *G06F 12/122* (2013.01); *G06F 12/123* (2013.01); *G06F 12/0866* (2013.01)
USPC .............................. 711/143; 711/144; 711/160

(58) Field of Classification Search
CPC . G06F 12/122; G06F 12/123; G06F 12/0866; G06F 2212/311
USPC .......................................... 711/143, 144, 160
See application file for complete search history.

(56) References Cited

U.S. PATENT DOCUMENTS

| | | | | |
|---|---|---|---|---|
| 4,972,316 | A * | 11/1990 | Dixon et al. .................. | 711/113 |
| 2011/0055458 | A1 * | 3/2011 | Kuehne ......................... | 711/103 |
| 2012/0011324 | A1 * | 1/2012 | Fung et al. .................... | 711/136 |
| 2013/0232294 | A1 * | 9/2013 | Benhase et al. ............... | 711/103 |

* cited by examiner

*Primary Examiner* — Than Nguyen
(74) *Attorney, Agent, or Firm* — Krishnedu Gupta; Jason A. Reyes

(57) ABSTRACT

A method is used in managing cache pages. A location pointer is maintained in a dynamic list of entries for cache page cleaning. The dynamic list includes a list of cache pages ordered from most recently used to least recently used. Based on flags associated with the cache pages, a count of the number of cache pages processed for cache page cleaning is maintained. In response to a change in the dynamic list, the location pointer and count are updated based on the processing status of an entry to which the change pertains.

20 Claims, 9 Drawing Sheets

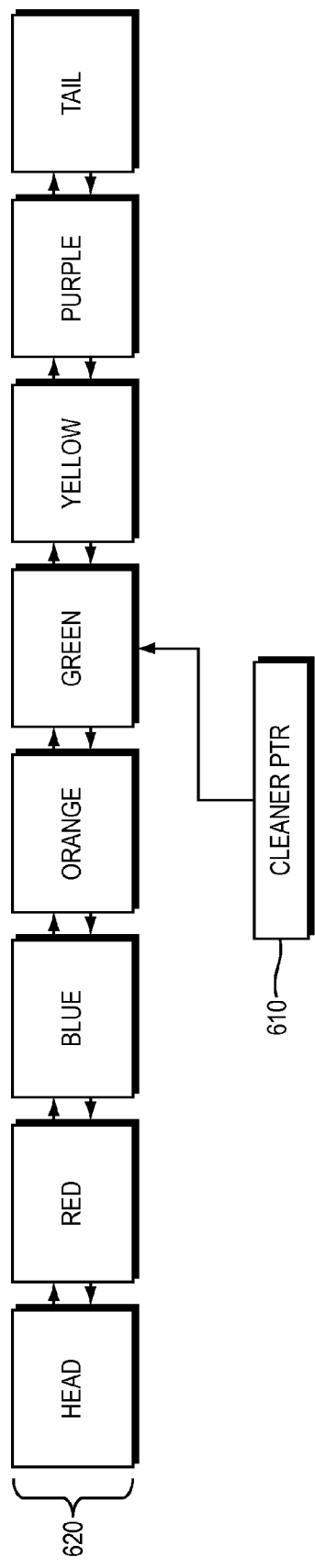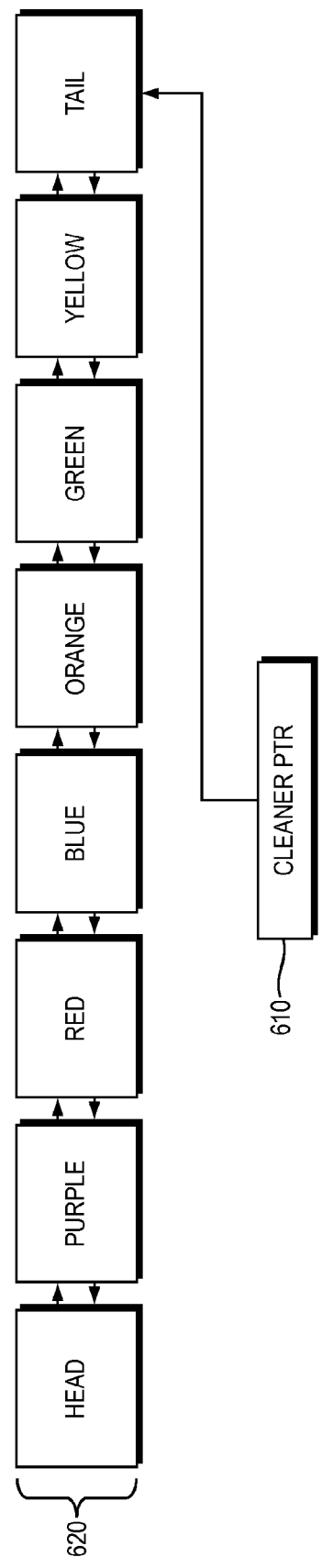

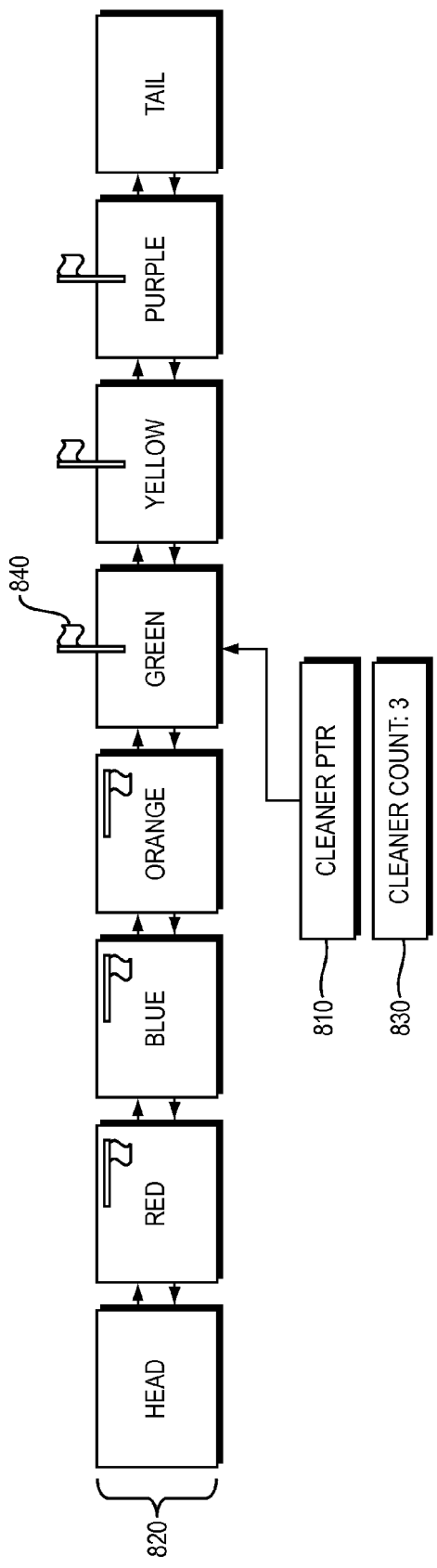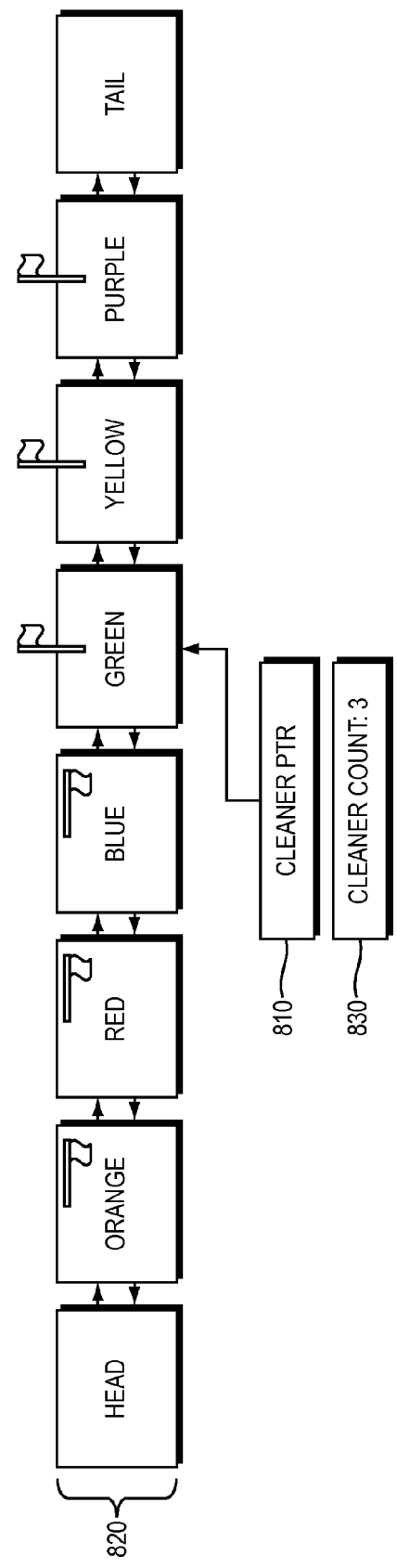

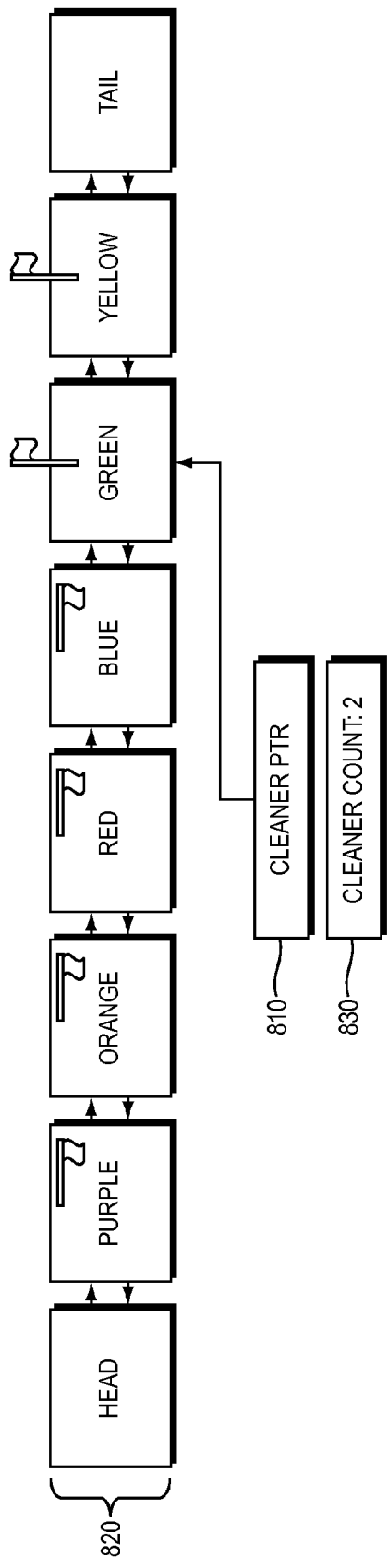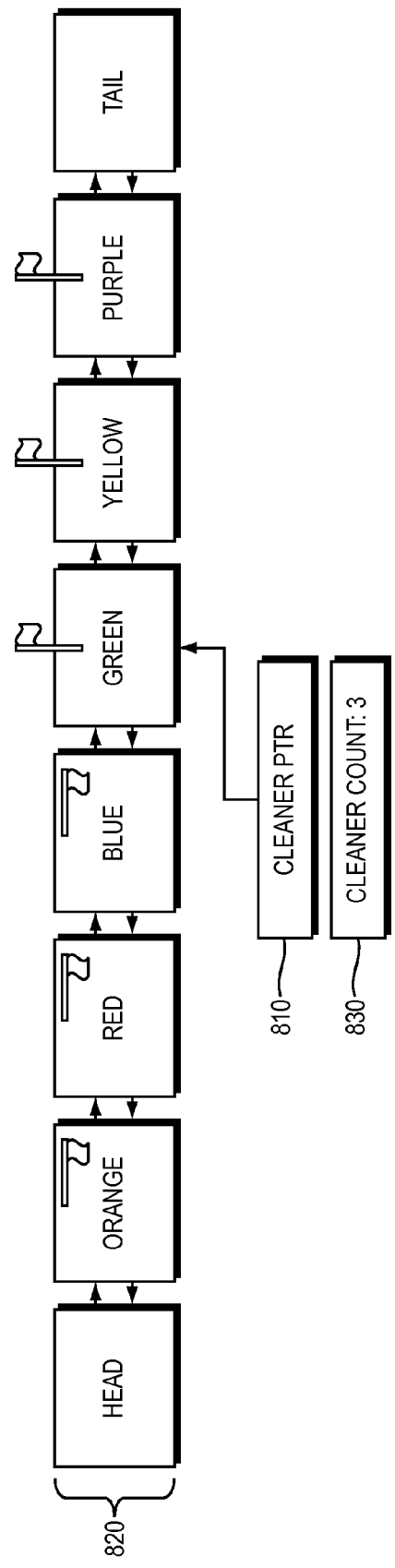

US 8,700,861 B1

MANAGING A DYNAMIC LIST OF ENTRIES FOR CACHE PAGE CLEANING

BACKGROUND

1. Technical Field

This application relates to managing cache pages.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In connection with a write operation, the data storage system may utilize a variety of different techniques such as write-back caching. With write-back caching, the data storage system may temporarily cache data received from a host within its storage cache and destage the cached data at different times onto the physical disk drives. As known in the art, the cache used in the data storage system may be implemented using a fast, volatile memory, such as RAM (random access memory).

It should be noted that a data storage system may include multiple storage processors storing data to a same set of storage devices. Each of the storage processors may have its own cache so that cached data for the write operations, as well as possibly other cached data, may be mirrored in the caches of the storage processors. Multiple storage processors may be desirable for use in providing fault tolerance, higher throughput, and the like.

In general, a storage system may use read cache to increase the speed of transactions between the storage processor and disk storage and increase the overall speed of the system. Typically, data is transferred from disk to read cache in pages or blocks of data. The data transferred typically includes data requested by the host system and optionally additional data, sometimes known as prefetched data, which is determined to be data that is most likely to be requested by the host system soon.

Usually the total size of the data on disk is significantly larger than amount of cache memory available in the system so that the cache eventually becomes full. As a result, the system must decide which pages in the cache are to be removed and which are maintained.

Due to the temporal locality of cache accesses, most pages that were accessed in the recent past are very likely to be accessed again the near future. Thus, systems typically use a least recently used (LRU) memory management process, where the page least recently accessed is removed from the cache.

A double linked list is a linked list containing a sequence of fields or nodes, each containing a data field and two link references, one pointing to a next node or data field and the other pointing to a previous node or field. For example, the pages of a buffer may include a "next pointer" to the page after the present page in the buffer and a "previous pointer" to the page before the present page in the buffer, forming a double linked list that can be traversed via the previous and next pointers.

SUMMARY OF THE INVENTION

A method is used in managing cache pages. A location pointer is maintained in a dynamic list of entries for cache page cleaning. The dynamic list includes a list of cache pages ordered from most recently used to least recently used. Based on flags associated with the cache pages, a count of the number of cache pages processed for cache page cleaning is maintained. In response to a change in the dynamic list, the location pointer and count are updated based on the processing status of an entry to which the change pertains.

BRIEF DESCRIPTION OF THE DRAWINGS

Features and advantages of the present invention will become more apparent from the following detailed description of exemplary embodiments thereof taken in conjunction with the accompanying drawings in which:

FIGS. 6-12 are diagrams illustrating processes that may be used in connection with techniques herein.

DETAILED DESCRIPTION OF EMBODIMENT(S)

Described below is a technique for use in managing cache pages, which technique may be used to help provide, among other things, maintaining a location pointer in a dynamic list for cache page cleaning. In accordance with the technique, a page cleaner for a cache (e.g., a fully automated storage tiering (FAST) cache) can maintain its position in the list of pages it is cleaning even when other pages are rearranged in the list, as described below. A count of the number of pages the page cleaner has examined is also maintained, e.g., so that the cleaner can determine how far it is through the list.

In a basic approach, in a FAST cache for example, a pointer is kept that points to the last page cleaned and the cleaner starts walking the pages from that point every time it is looking for another page to clean. If the list is changed in the basic approach, the pointer is reset and the cleaner restarts the search for a page to clean at the end. In a system with several million pages, the basic approach can consume a considerable amount of time and there is no easily available counter of how many pages have been examined.

By contrast, an enhanced approach maintains a count of the number of pages cleaned and allows the cleaner to start from its last location without resetting the list when the list is changed. For a system with several million pages, the enhanced approach can save considerable CPU time.

Figure 1:
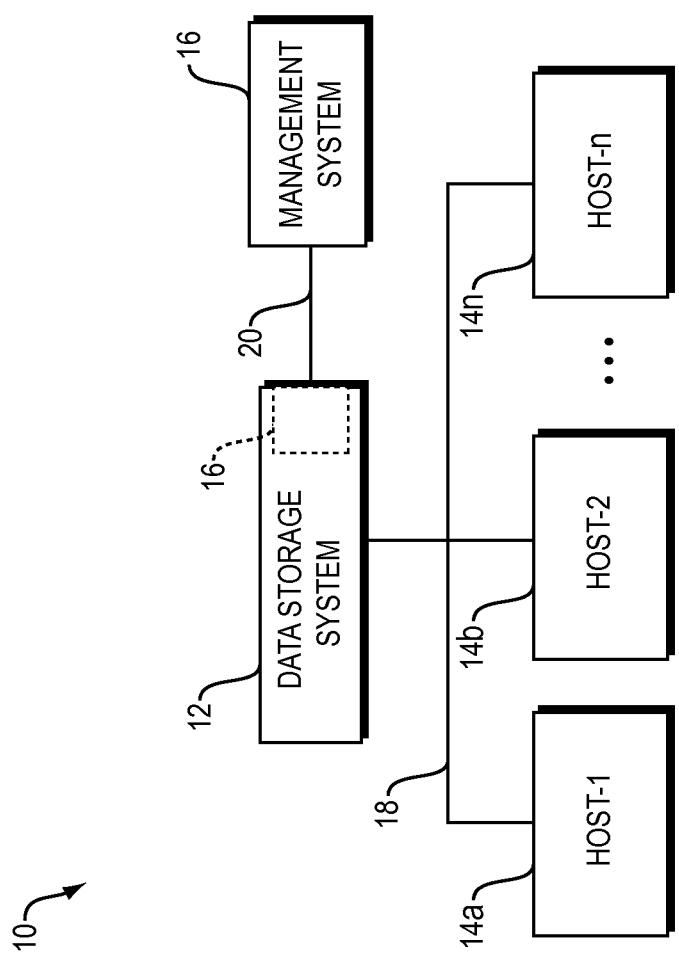
FIG. 1 is an example of an embodiment of a computer system that may utilize the techniques described herein.

Referring to FIG. 1, shown is an example of an embodiment of a computer system that may be used in connection with performing the techniques described herein. The computer system 10 includes one or more data storage systems 12 connected to server or host systems 14a-14n through communication medium 18. The system 10 also includes a management system 16 connected to one or more data storage systems 12 through communication medium 20 and/or at least partially included in the one or more data storage systems 12. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, at least part of the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance.

In connection with an embodiment in which the data storage 12 is an appliance including hardware and software, the appliance may also include other software for performing different data services. For example, the appliance may include backup server software which interacts with software on the hosts 14a-14n when performing a backup operation.

In another embodiment, the data storage systems 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein.

Figure 2:
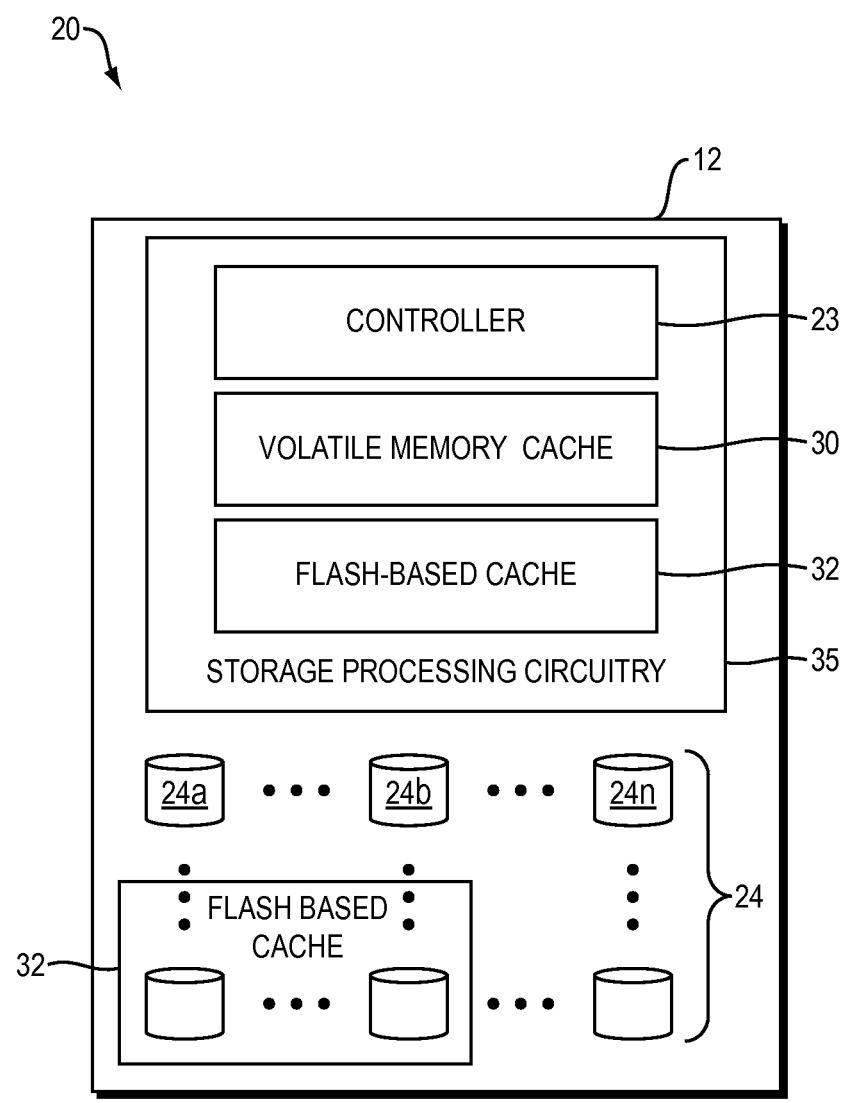
FIGS. 2, 4-5 are diagrams illustrating in more detail components that may be used in connection with techniques herein.

Referring to FIG. 2, shown is a more detailed representation of components that may be included in an embodiment using the techniques herein. In the example 20, a data storage system 12 may include disks 24 accessed by logical volumes as described above. The data storage system 12 may also include controller 23, a volatile memory cache and a flash-based cache 32. As described in more detail below, one or more of the disks 24 may be, include, or be included in a flash-based disk, and cache 32 may include such flash-based disk.

The data storage system 12 may also include a volatile memory (VM) storage cache 30 including any one or more different types of volatile memory, such as RAM. The flash-based cache 32 is a flash-based memory or solid state drive (SSD) which is non-volatile to store data persistently. The data storage system 12 may utilize a write-back caching technique in which data for a write request is first written to VM cache 30. The VM cache 30 is used to designate some portion of VM used as a write cache although there may be other VM included in the data storage system for other purposes. During normal operation, data from the VM cache 30 may be stored to a portion of the component 32, and the data may be destaged at a later point from the component 32 to disk.

The controller 23 may be configured to perform data storage operations on behalf of the hosts of FIG. 1 during normal operation using the volatile memory storage cache 30, the flash-based cache 32, and the disks 24. As described above during normal operation, when a host sends a request to write data to the data storage system, the controller 23 stores the data of the write request in the VM cache 30. Also, the controller may be configured to perform, for example, as a background process, to copy data from the VM cache to a portion of the component 32. At some point later, the data is destaged or written out to the disks 24 from the component 32.

As will be appreciated by those skilled in the art, the data storage 12 may also include other components than as described for purposes of illustrating the techniques herein.

Figure 3:
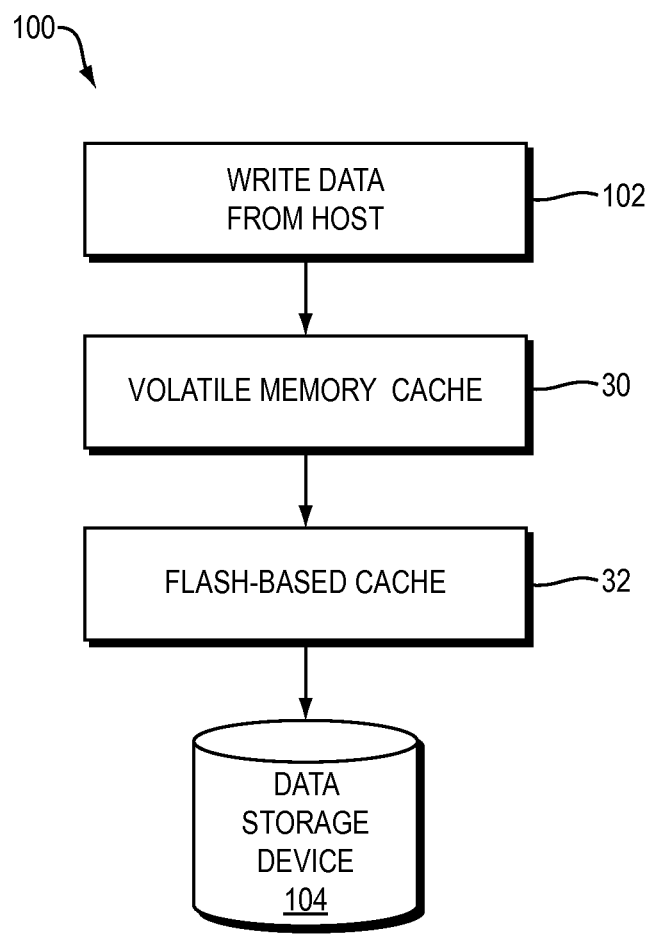
FIG. 3 is a diagram illustrating the flow of data in connection with processing a write request.

Referring to FIG. 3, shown is a flow diagram illustrating the flow of data in the data storage system. During normal processing as described herein, the write data received from the host 102 is cached in the VM cache 30. Depending on the situation and the implementation of a cache controller, data from the VM cache 30 may be copied from the component 30 to a portion of the flash-based cache 32. For example, data in VM cache 30 may be written directly to disks 24 or may be stored in cache 32, depending on whether the data has been referenced frequently. For example, single references may go directly to disks 24.

Such copying of data from 30 to 32 during normal operation may be performed, for example, as a background copying operation. At some point later, the data is destaged from the component 32 to the data storage device 104, such as the disks 24 of FIG. 2. The foregoing describes processing during normal operation of the data storage system.

Figure 4:
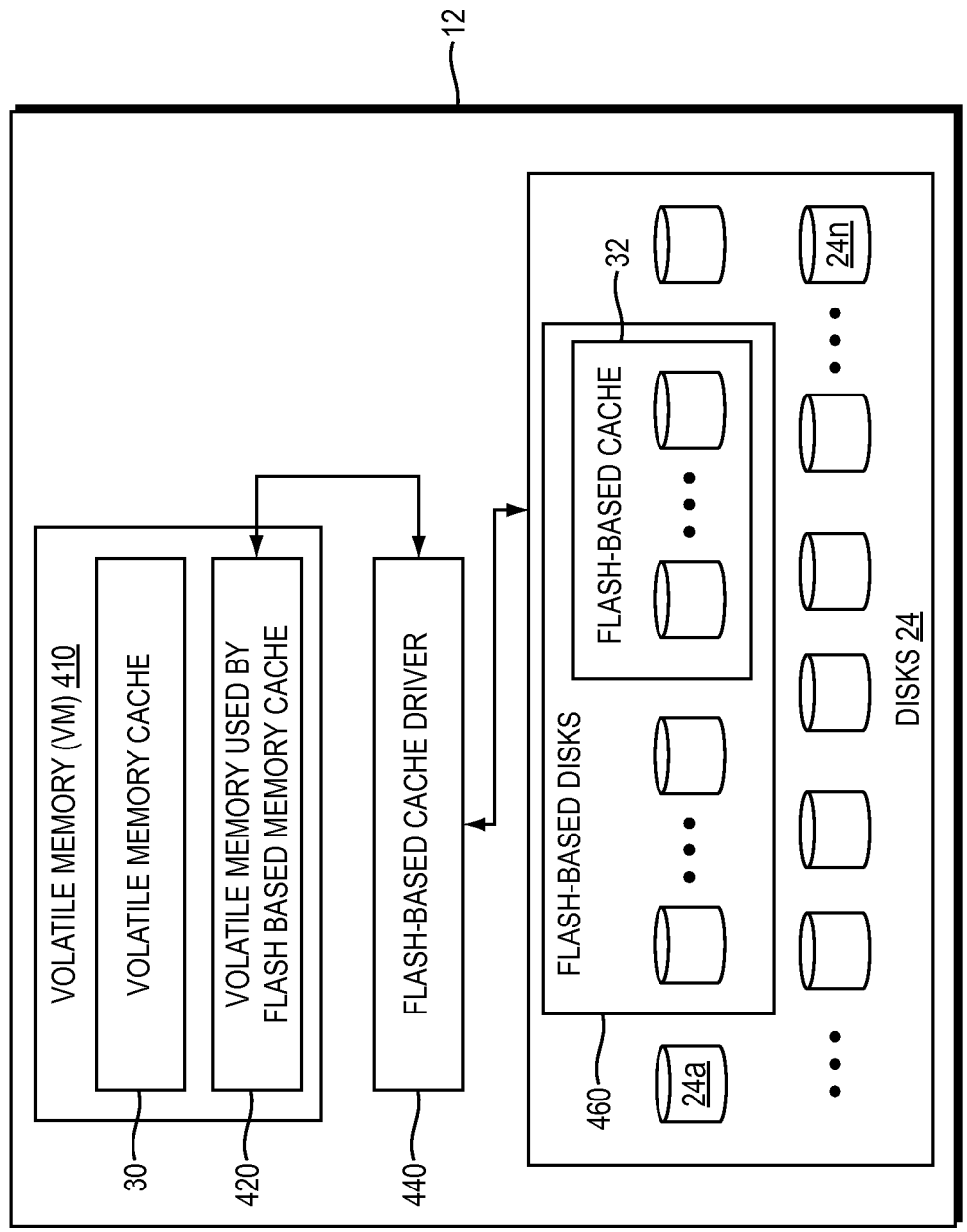

Referring to FIG. 4, shown is an example illustrating one configuration of the VM cache 30 and flash-based cache 32 that may be used in an embodiment with the techniques herein. System 12 has volatile memory (VM) 410 that includes cache 30, and VM portion 420 which is used by flash-based cache 32. Disks 24 include flash-based disks 460. System 12 has a flash-based cache driver 440 that helps control cache 32 using VM portion 420.

In the example of FIG. 4, cache 32 is created by using a subset of flash-based disks 460 that would otherwise be used the same way that the rest of disks 24 are used, e.g., for user data. Since the number of disks in cache 32 can be large, e.g., 100 disks, and therefore cache 32 can be large in size, VM portion 420 may need to be large as well to support such a size of cache 32.

Flash based cache 32 and its driver 440 require, in the form of VM portion 420, some amount of what would normally be part of VM cache 30 in order to maintain its internal state, e.g., for metadata for cache management, including lookup tables specifying where, if possible, requested data can be found in cache 32, and data usage counters and related information to help determine which data should be present in cache 32.

Figure 5:
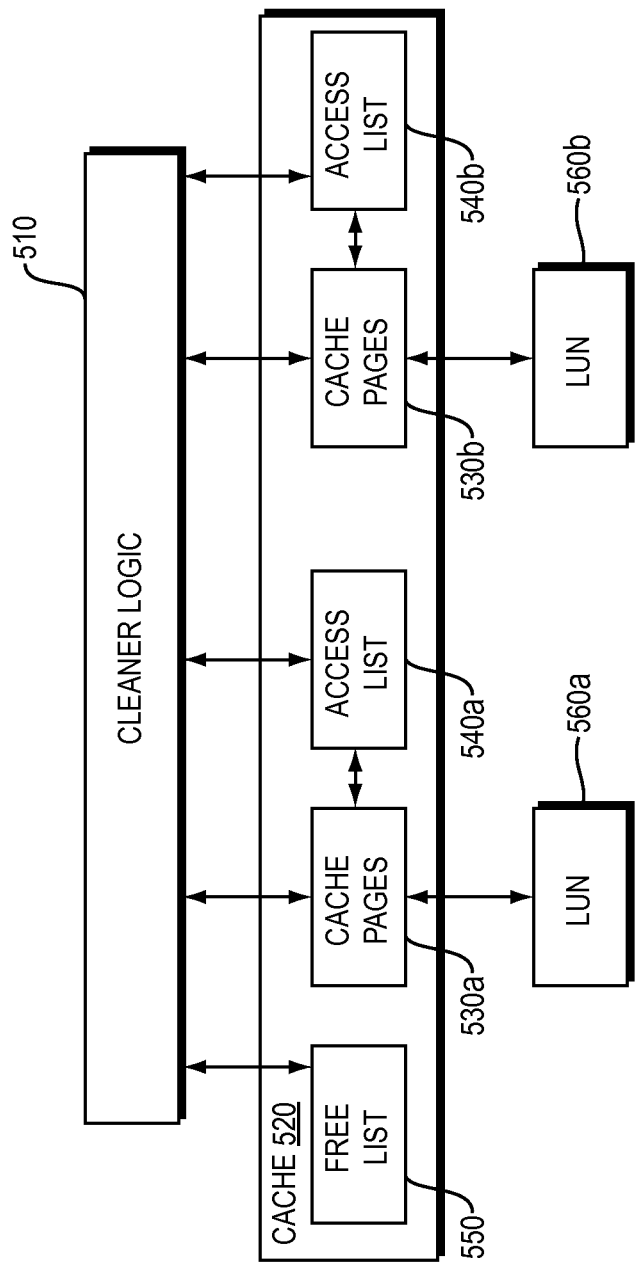

FIG. 5 illustrates an example implementation of a cache system in accordance with the technique described herein. Cache 520 may be implemented using volatile memory or storage and/or non-volatile memory or storage such as flash-based memory. For example, all or a portion of cache 520 may be, include, or be included in cache 30 and/or cache 32 of FIG. 4. Cleaner logic 510 may be included in and/or executed by controller 23 of FIG. 2. LUNs 560A, 560B are logical volumes that may be implemented using one or more disks 24 or sets of disks 24 of FIG. 4.

Cache 520 has free list 550, sets 530A, 530B of cache pages, and access lists 540A, 540B corresponding to sets 530A, 530B respectively. (In at least some implementations, lists 550, 540A, 540B reside in VM portion 420 as part of metadata for cache management.)

Cache 520 includes pages that are used to hold cached versions of pages or blocks of data of LUNs. In the example implementation, set 530A includes cache pages that are used with LUN 560A, and set 530B includes cache pages that are used with LUN 560B.

Access lists, described in more detail below, are dynamic lists that are based on an LRU memory management process ("LRU process"). In the example implementation, access list 540A lists pages of set 530A in order based on the LRU process, and access list 540B lists pages of set 530B in order based on the LRU process.

Free list 550 is a list of cache pages of cache 520 that are available for use. Depending on the implementation, when conditions indicate that cache pages need to be removed from use (e.g., from sets 530A, 530B) and added to list 550 or otherwise made available for different use, cleaner logic 510 may process lists 540A, 540B as described below. For example, cleaner logic may clean cache pages frequently but may not always remove clean cache pages to put them on the free list. If, in the example, the free list is below a threshold, the cleaner logic puts clean cache pages on the free list, but if the free list already has sufficient entries, the cleaner logic cleans cache pages and leaves them associated with their respective LUNs.

FIG. 6 illustrates double-linked list 620 which may be, include, or be included in a list such as list 540A or 540B of FIG. 5, wherein page references are labeled for illustration purposes with color names such as page green, page yellow, and so on. List 620 is ordered by how recently each page was accessed (e.g., used), and tail indicates the least recently used end of the list and head indicates the most recently used end of the list.

Cleaner pointer 610 points to where logic 510 is currently starting from. (In at least some implementations, cleaner pointer 610 resides in VM portion 420 as part of metadata for cache management.) Generally, logic 510 processes list 620 from tail to head, so that less recently used pages are processed for cleaning before more recently used pages. In at least one implementation, cleaning a page may include flushing the page to disk if necessary, disassociating the page from the LUN, and adding the page to free list 550. Flushing a page to disk is a process whereby valid and current information from the page is written back into the page's corresponding area in the LUN.

FIG. 6 illustrates that pointer 610 currently points to page green, which means that pages green, yellow, and purple have already been processed by logic 510.

FIGS. 6-7 illustrate an aspect of the basic approach wherein when list 620 changes, e.g., because one or more pages referenced in list 620 have been accessed, pointer 610 is changed to point to the tail. In the example of FIGS. 6-7, the page of page purple has just been accessed and therefore page purple is moved to the head of list 620, and pointer 610 is changed to point to the tail in accordance with the basic approach. This means that logic 510 must start over from the tail of the list.

FIGS. 8-12 illustrate aspects of the enhanced approach. Pointer 810 is the same as pointer 610, and list 820 is the same as list 620 except that each page reference also has a corresponding flag such as flag 840 for page green. A cleaner count 830 is maintained to keep track of how many pages in list 820 have been processed by logic 510. (In at least some implementations, cleaner count 830 resides in VM portion 420 as part of metadata for cache management.)

Each flag such as flag 840 is used to keep track of whether a corresponding page in a list has been processed by logic 510. FIG. 8 illustrates that flag 840 and flags for pages green, yellow, and purple are set, and flags for pages red, blue, and orange are not set, indicating that pages green, yellow, and purple have been processed by logic 510, and pages red, blue, and orange have not been processed by logic 510. In at least some implementations, count 830 is the same as the number of flags that have been set.

In the enhanced approach, moving any page reference that has a set flag means additional checking as described in the following logical description:

If page reference flag is set, decrement count.
If page reference is pointed to by pointer, move pointer to next page reference towards tail.
Flag for page reference that was moved must be reset.

FIGS. 8-12 illustrate how changes to the list are handled in the enhanced approach. FIG. 9 illustrates that page orange has moved to the head of the list. Since page orange had not yet been processed as indicated by its flag not being set, pointer 810 and count 830 are not affected.

In the same sequence, FIG. 10 illustrates that page purple has moved to the head of the list. The flag for page purple is changed from set to not set because now logic 510 has not yet processed page purple since the last access for that page. Pointer 810 continues to point to page green but count 830 is decremented to 2 since now only two flags in the list are set.

Figure 12:
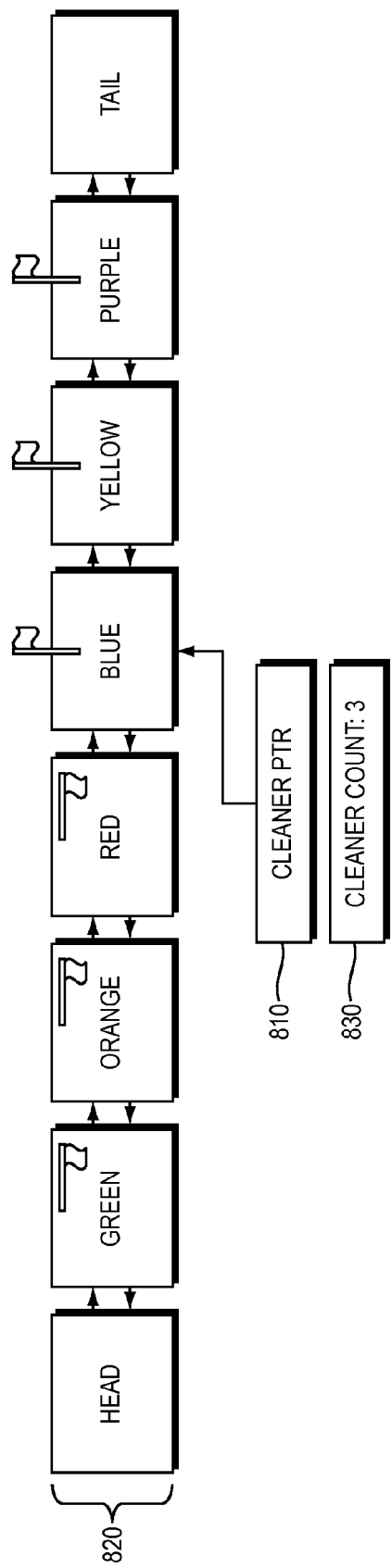

In a new sequence, FIGS. 11-12 illustrate that the page currently pointed to by pointer 810, here page green, is the page that has moved to the head of the list as shown in FIG. 12, and that logic 510 has processed page blue. Accordingly, the flag for page green is changed to not set, pointer 810 is changed to point to page blue, and count 830 is 3 because count 830 was decremented due to the flag for page green being changed to not set and then incremented when the flag for page blue was set.

With respect to other aspects of the enhanced approach, removing page references from the tail of the list (in connection with page reuse and the free list) requires adjusting the count and possibly the pointer, depending on how many page references are removed, and new page references added to the head of the list start out with flags not set.

Advantages of the enhanced approach may include that the cleaner logic can restart by following the pointer to the appropriate page reference, which save CPU time and resources, the count can be compared to the total number of page references in the list to determine a percentage indicating how much of the list has been processed by the cleaner logic, and the percentage can be used to sort multiple lists to help sets of pages to be processed equally in page cleaning.

In particular with respect to processing sets of pages that correspond to LUNs, the count and/or the percentage may be used to help manage the sets. For example, if the percentage is very low for a set, which indicates that all or nearly all of the pages in the set are accessed so frequently that the cleaner logic is making little progress through the list, it may be determined that more pages need to be allocated to the set. In another example, if the percentage is very high for a set, which indicates that all or nearly all of the pages in the set are accessed so infrequently that the cleaner logic is making great progress through the list, it may be determined that fewer pages need to be allocated to the set.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:
1. A method for use in managing cache pages, the method comprising:
maintaining a location pointer in a dynamic list of entries for cache page cleaning, wherein the dynamic list comprises a list of cache pages ordered from most recently used to least recently used;

based on flags associated with the cache pages, maintaining a count of the number of cache pages processed for cache page cleaning; and in response to a change in the dynamic list, updating the location pointer and count based on the processing status of an entry to which the change pertains.

2. The method of claim 1 wherein a fully automated storage tiering process is applied to the cache pages.

3. The method of claim 1 wherein the cache page cleaning starts from its last location when the dynamic list is changed.

4. The method of claim 1 wherein the cache pages that are used to hold cached versions of pages of data of LUNs.

5. The method of claim 1 wherein cache page cleaning causes cache pages to be added to a list of cache pages that are available for use.

6. The method of claim 1 wherein cache page cleaning leaves cache pages associated with respective LUNs.

7. The method of claim 1 wherein cache page cleaning processes less recently used cache pages before more recently used cache pages.

8. The method of claim 1 wherein cache page cleaning comprises flushing cache pages to disk if necessary, disassociating the cache pages from LUNs, and adding the cache pages to a free list.

9. The method of claim 1 wherein each entry has a respective flag used to keep track of whether a corresponding cache page has been processed by cache page cleaning.

10. The method of claim 1 wherein additional checking is performed when the change involves moving an entry that has a set flag.

11. A system for use in managing cache pages, the system comprising:

first logic maintaining a location pointer in a dynamic list of entries for cache page cleaning, wherein the dynamic list comprises a list of cache pages ordered from most recently used to least recently used;

second logic maintaining, based on flags associated with the cache pages, a count of the number of cache pages processed for cache page cleaning; and third logic updating, in response to a change in the dynamic list, the location pointer and count based on the processing status of an entry to which the change pertains.

12. The system of claim 11 wherein a fully automated storage tiering process is applied to the cache pages.

13. The system of claim 11 wherein the cache page cleaning starts from its last location when the dynamic list is changed.

14. The system of claim 11 wherein the cache pages that are used to hold cached versions of pages of data of LUNs.

15. The system of claim 11 wherein cache page cleaning causes cache pages to be added to a list of cache pages that are available for use.

16. The system of claim 11 wherein cache page cleaning leaves cache pages associated with respective LUNs.

17. The system of claim 11 wherein cache page cleaning processes less recently used cache pages before more recently used cache pages.

18. The system of claim 11 wherein cache page cleaning comprises flushing cache pages to disk if necessary, disassociating the cache pages from LUNs, and adding the cache pages to a free list.

19. The system of claim 11 wherein each entry has a respective flag used to keep track of whether a corresponding cache page has been processed by cache page cleaning.

20. The system of claim 11 wherein additional checking is performed when the change involves moving an entry that has a set flag.

* * * * *